(No Model.)
J. H. CANNING.
HAT LINING AND COVER.
No. 291,679. Patented Jan. 8, 1884.
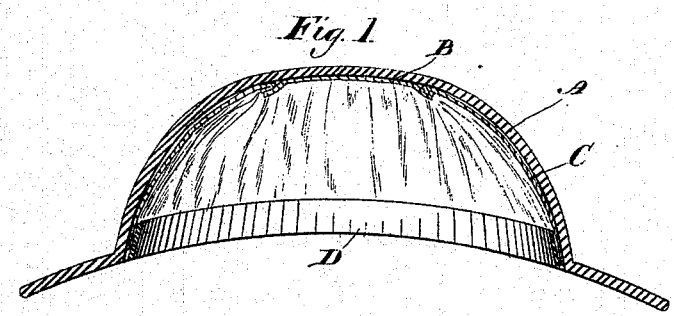
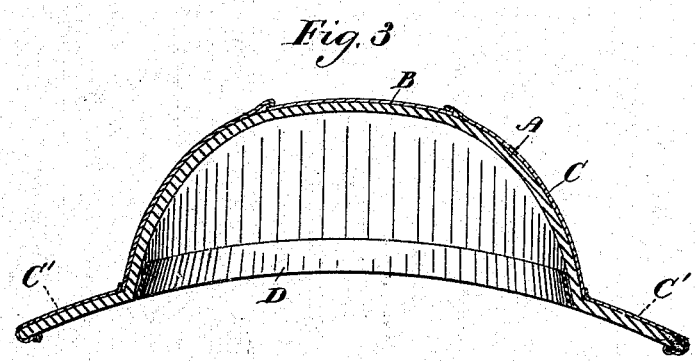
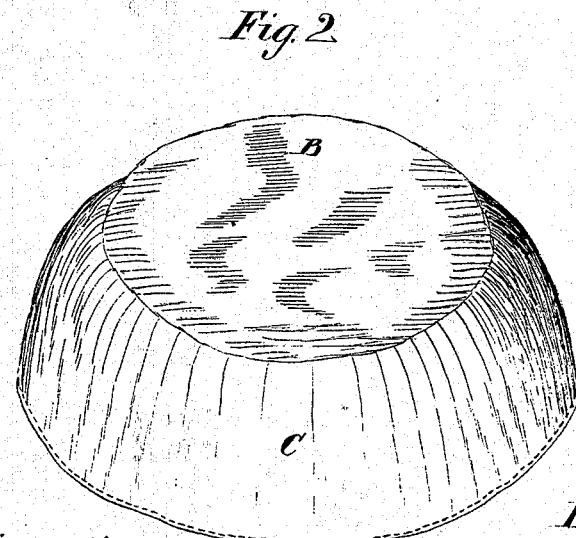
Witnesses
S. S. Williamson
W. J. Haviland
Inventor
James H. Canning
By Wooster & Smith
Attys

United States Patent Office.

JAMES H. CANNING, OF DANBURY, CONNECTICUT.

HAT LINING AND COVER.

SPECIFICATION forming part of Letters Patent No. 291,679, dated January 8, 1884.

Application filed November 5, 1883. (No model.)

*To all whom it may concern:*

Be it known that I, JAMES H. CANNING, a citizen of the United States, residing at Danbury, in the county of Fairfield and State of Connecticut, have invented certain new and useful Improvements in Hat Linings and Covers; and I do hereby declare the following to be a full, clear, and exact description of the invention, such as will enable others skilled in the art to which it appertains to make and use the same.

My invention relates to hats, and has for its object to produce an ornamental lining which may readily be detached, and is adapted to serve as a water-proof covering when placed over the outside of the hat.

With these ends in view my invention consists in a lining constructed in any ordinary manner, the inner side of which is of ornamental appearance, and serves the usual purposes of a hat-lining, and the exterior of which is water-proof, thus adapting the lining to serve as a covering for the exterior of the hat in rainy weather.

In order that others may be able to understand and use my invention, I will proceed to describe the same, referring by letters to the accompanying drawings, forming a part of this specification, in which—

Figure 1 is a longitudinal section of a hat, showing my improved lining in place in the interior of the hat; Fig. 2, a perspective of the lining detached; and Fig. 3, a longitudinal section of a hat, showing the lining applied as an external covering, and also showing my improved lining so constructed that the hat-brim as well as the crown is covered.

Similar letters denote like parts in the several figures of the drawings.

A represents a hat, B the tip or crown lining, and C the side lining.

In Fig. 1 I have shown the lining in place within the hat, the lower edge of the side lining being behind the sweat-band D, and held in place thereby. In this position the functions of my improved lining are simply those of an ordinary hat-lining.

The material of which either side is made is not an essential feature of my invention. It is of course desirable that the inner side should present an ornamental appearance.

In the better class of goods I shall of course make the inner side of silk or satin, so that in appearance, when in place inside the hat, my improved lining will not be distinguishable from an ordinary silk or satin lining.

Fig. 2 shows the outer side of the lining, which is made water-proof in any suitable manner, or is made of water-proof material. I preferably use light-weight (gossamer) rubber cloth.

For the purposes of my invention it is immaterial whether the lining be made in one thickness or two. When a fine grade of gossamer rubber cloth is used—as, for instance, when the rubber is applied to a silk or satin backing—but one thickness need be used; but when cotton-backed gossamer is used an additional thickness of light silk or satin may be used to give an ornamental appearance when within the hat.

Fig. 2 shows my improved lining as I ordinarily make it—that is, adapted to cover the crown only when used as a protector in bad weather. The brims, being much stiffer than the bodies of hats, are much less liable to injury from rain or snow, which, as is well known, will quickly ruin a new hat.

In Fig. 3 I have shown my improved lining removed from within the hat and placed over it as a cover or protector. This may be done in a few seconds' time, and will often save a valuable hat from being spoiled by a shower.

In Fig. 3 I have also shown a slightly different style of protector, which covers the brim as well as the crown. This protector I preferably make in two pieces sewed together at the point where the brim joins the crown; but I do not wish to confine myself to the construction, as it may be made in one piece and be used with equal facility.

When placed within the hat as a lining, the brim-cover C' lies behind the said lining C.

Having thus described my invention, what I claim as new, and desire to secure by Letters Patent, is—

1. A detachable hat-lining which is also adapted for use as a cover to the hat, substantially as described.

2. A detachable hat-lining constructed of water-proof material, for the purpose described.

3. A hat-lining the inner side of which is made ornamental, and serves the ordinary purposes of a hat-lining, and the outer side of which is water-proof to adapt it for use as a hat-cover in bad weather.

4. A hat lining and cover in which the ordinary crown and side lining are adapted to serve as a cover for the hat-body, and which has an additional piece made integral therewith or attached thereto in any suitable way, to serve as a cover for the brim, substantially as described.

In testimony whereof I affix my signature in presence of two witnesses.

JAMES H. CANNING.

Witnesses:
    D. E. ROGERS,
    HIRAM SIMONS.